United States Patent
Josiam et al.

(10) Patent No.: US 10,257,854 B2
(45) Date of Patent: Apr. 9, 2019

(54) MANAGEMENT OF UPLINK MULTI-USER TRANSMISSIONS IN WIRELESS LOCAL AREA NETWORKS

(71) Applicant: Samsung Electronics Co., Ltd., Suwon-si, Gyeonggi-do (KR)

(72) Inventors: Kaushik M. Josiam, Mountain View, CA (US); Rakesh Taori, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 14/992,996

(22) Filed: Jan. 11, 2016

(65) Prior Publication Data

US 2016/0227533 A1 Aug. 4, 2016

Related U.S. Application Data (60) Provisional application No. 62/110,975, filed on Feb. 2, 2015.

(51) Int. Cl.
*H04W 72/04* (2009.01)
*H04W 74/00* (2009.01)
*H04W 84/12* (2009.01)
*H04W 74/08* (2009.01)

(52) U.S. Cl.
CPC ...... *H04W 74/006* (2013.01); *H04W 74/0808* (2013.01); *H04W 84/12* (2013.01)

(58) Field of Classification Search
CPC .............................................. H04W 72/0446
See application file for complete search history.

(56) References Cited

U.S. PATENT DOCUMENTS

| | | | |
|---|---|---|---|
| 2010/0128669 A1* | 5/2010 | Chun | H04W 74/06 370/328 |
| 2011/0268094 A1 | 11/2011 | Gong et al. | |
| 2012/0008572 A1 | 1/2012 | Gong et al. | |
| 2012/0224540 A1 | 9/2012 | Kwon et al. | |
| 2013/0301551 A1 | 11/2013 | Ghosh et al. | |
| 2014/0328235 A1 | 11/2014 | Merlin et al. | |
| 2015/0016558 A1 | 1/2015 | Choi et al. | |

(Continued)

FOREIGN PATENT DOCUMENTS

| | | |
|---|---|---|
| EP | 3190853 A1 | 7/2017 |
| EP | 3220706 A1 | 9/2017 |

OTHER PUBLICATIONS

International Search Report dated May 25, 2016 in connection with International Application No. PCT/KR2016/001099, 3 pages.

(Continued)

*Primary Examiner* — John D Blanton (57) ABSTRACT

A method, station, and access point for transmitting in a wireless local area network. A method for operating the station includes receiving a beacon signal from an access point in the wireless local area network. The method also includes identifying from the beacon signal a target transmission time of a trigger frame to be transmitted by the access point for an uplink multi-user transmission. A method for operating the access point includes transmitting, to one or more stations in the wireless local area network, a beacon signal that indicates a target transmission time of a trigger frame to be transmitted by the access point for an uplink multi-user transmission.

20 Claims, 6 Drawing Sheets

(56) References Cited

U.S. PATENT DOCUMENTS

| | | | |
|---|---|---|---|
| 2015/0063111 A1* | 3/2015 | Merlin | H04L 47/12 370/235 |
| 2015/0063258 A1* | 3/2015 | Merlin | H04L 47/12 370/329 |
| 2016/0143006 A1* | 5/2016 | Ghosh | H04W 74/004 370/329 |
| 2016/0143010 A1* | 5/2016 | Kenney | H04W 4/008 370/330 |
| 2016/0212702 A1* | 7/2016 | Ghosh | H04W 52/0216 |
| 2017/0127298 A1* | 5/2017 | Ryu | H04W 24/02 |
| 2017/0311310 A1* | 10/2017 | Ryu | H04W 72/0413 |
| 2017/0318134 A1* | 11/2017 | Du | H04L 69/324 |

OTHER PUBLICATIONS

Written Opinion of the International Searching Authority dated May 25, 2016 in connection with International Application No. PCT/KR2016/001099, 6 pages.

Supplementary European Search Report dated Jan. 30, 2018 in connection with European Patent Application No. 16 74 6809.

* cited by examiner

MANAGEMENT OF UPLINK MULTI-USER TRANSMISSIONS IN WIRELESS LOCAL AREA NETWORKS

CROSS-REFERENCE TO RELATED APPLICATION(S) AND CLAIM OF PRIORITY

This application claims priority to U.S. Provisional Patent Application No. 62/110,975 entitled "METHODS FOR MANAGEMENT OF UPLINK MULTI-USER TRANSMISSIONS IN WIRELESS LOCAL AREA NETWORKS" filed on Feb. 2, 2015. The above-identified provisional patent application is hereby incorporated by reference in its entirety.

TECHNICAL FIELD

This disclosure relates generally to wireless local area networks (WLANs). More specifically, this disclosure relates to management of uplink (UL) multi-user (MU) transmissions in WLANs.

BACKGROUND

IEEE 802.11ac supported MU transmission using spatial degrees of freedom via MU multiple-input multiple-output (MIMO) in the downlink (DL) direction from the access point (AP) to the stations (STAs). To improve efficiency, IEEE 802.11ax is considering using both Orthogonal Frequency Division Multiple Access (OFDMA)/MU-MIMO in both DL and UL directions. In addition to supporting frequency and spatial multiplexing from AP to multiple STAs, transmissions from multiple STAs to the AP are also supported, i.e., MU transmissions.

SUMMARY

Embodiments of the present disclosure provide management and scheduling of UL MU transmissions in WLANs.

In one embodiment, a STA for transmitting in a WLAN is provided. The STA includes a transceiver and a controller. The transceiver is configured to receive a beacon signal from an AP in the WLAN. The controller is configured to identify, from the beacon signal, a target transmission time of a trigger frame to be transmitted by the AP for an UL multi-user transmission.

In another embodiment, an AP for transmitting in a WLAN is provided. The AP includes a controller and a transceiver operably connected to the controller. The transceiver is configured to transmit, to one or more STAs in the WLAN, a beacon signal that indicates a target transmission time of a trigger frame to be transmitted by the AP for an UL multi-user transmission.

In yet another embodiment, a method for operating a STA in a WLAN is provided. The method includes receiving a beacon signal from an AP in the WLAN. The method also includes identifying, from the beacon signal, a target transmission time of a trigger frame to be transmitted by the AP for an UL multi-user transmission.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that the AP is central node in the network receives traffic for multiple STAs and can decide the AP it wants to transmit using MU or single user (SU) modes to STAs. To enable UL MU operation, the AP needs to know which STAs have traffic to send, which STAs can be scheduled together in the UL transmission, whether to use OFDMA or MU-MIMO. Accordingly, embodiments of the present disclosure enable UL MU operation. Specifically, embodiments of the present disclosure addressing the issues related to the management and scheduling of the UL MU transmission.

Figure 1:
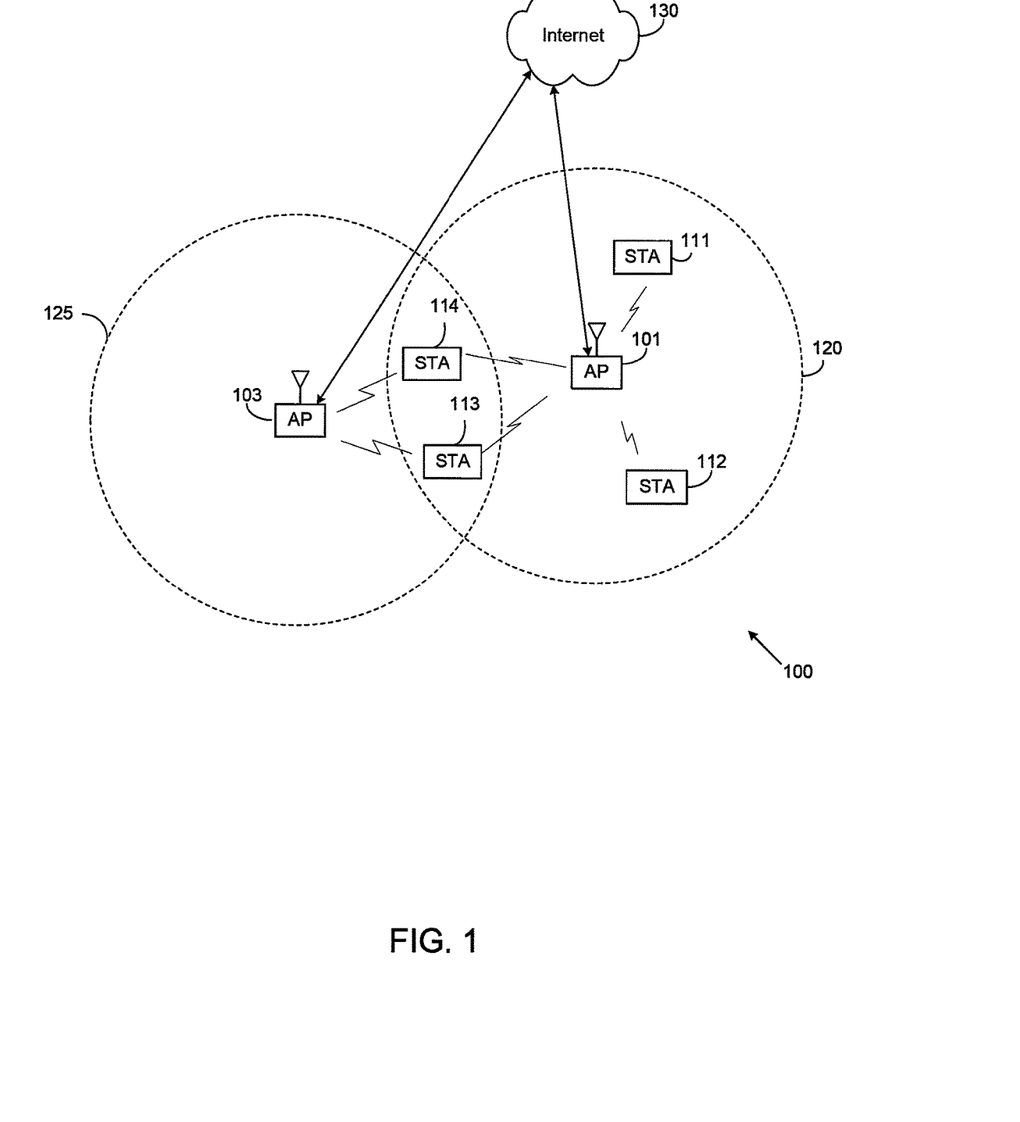
FIG. 1 illustrates an example wireless network according to illustrative embodiments of the present disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes APs 101 and 103. The APs 101 and 103 communicate with at least one network 130, such as the Internet, a proprietary Internet Protocol (IP) network, or other data network.

The AP 101 provides wireless access to the network 130 for a plurality of stations (STAs) 111-114 within a coverage area 120 of the AP 101. The APs 101-103 may communicate with each other and with the STAs 111-114 using WiFi or other WLAN communication techniques.

Depending on the network type, other well-known terms may be used instead of "access point" or "AP," such as "router" or "gateway." For the sake of convenience, the term "AP" is used in this patent document to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this patent document to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for management of UL MU transmissions in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
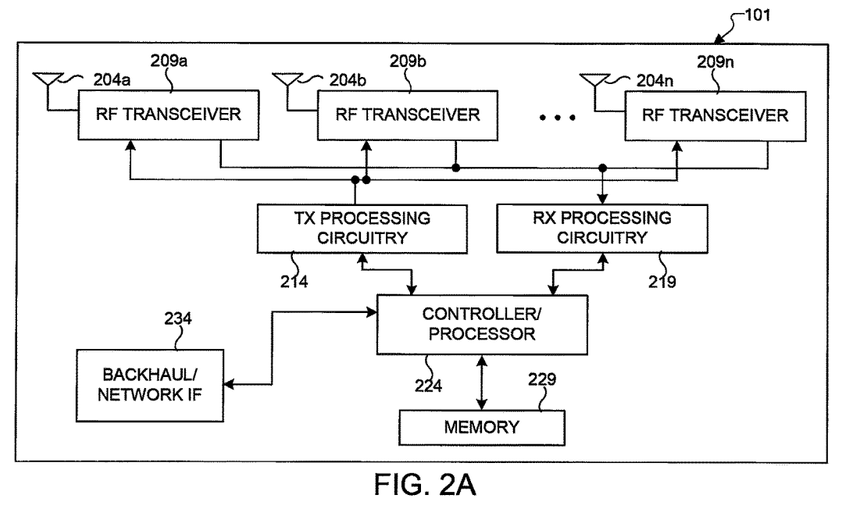
FIG. 2A illustrates an example AP according to illustrative embodiments of the present disclosure.

FIG. 2A illustrates an example AP 101 according to this disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

As shown in FIG. 2A, the AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234.

The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. Any of a wide variety of other functions could be supported in the AP 101 by the controller/processor 224. In some embodiments, the controller/processor 224 includes at least one microprocessor or microcontroller.

The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver.

The memory 229 is coupled to the controller/processor 224. Part of the memory 229 could include a RAM, and another part of the memory 229 could include a Flash memory or other ROM.

As described in more detail below, the AP 101 may include circuitry and/or programming for management of UL MU transmissions in WLANs. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
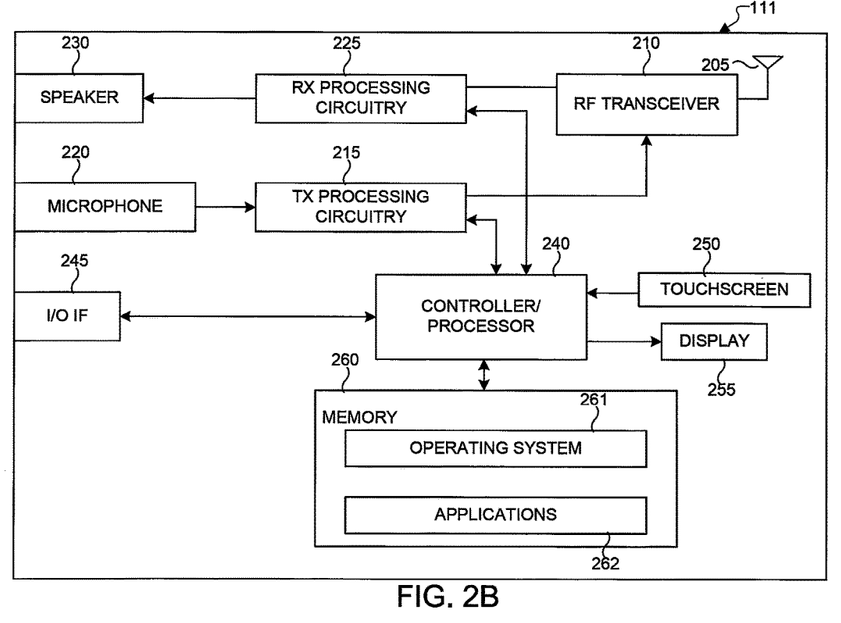
FIG. 2B illustrates an example STA according to illustrative embodiments of the present disclosure.

FIG. 2B illustrates an example STA 111 according to this disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

As shown in FIG. 2B, the STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to provide management of UL MU transmissions in WLANs. In some embodiments, the controller/processor 240 includes at least one microprocessor or microcontroller.

The controller/processor 240 is also capable of executing other processes and programs resident in the memory 260, such as operations for management of UL MU transmissions in WLANs. The controller/processor 240 can move data into or out of the memory 260 as required by an executing process. In some embodiments, the controller/processor 240 is configured to execute a plurality of applications 262, such as applications for MU communications, including management of UL MU transmissions in WLANs. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites.

The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Figure 3:
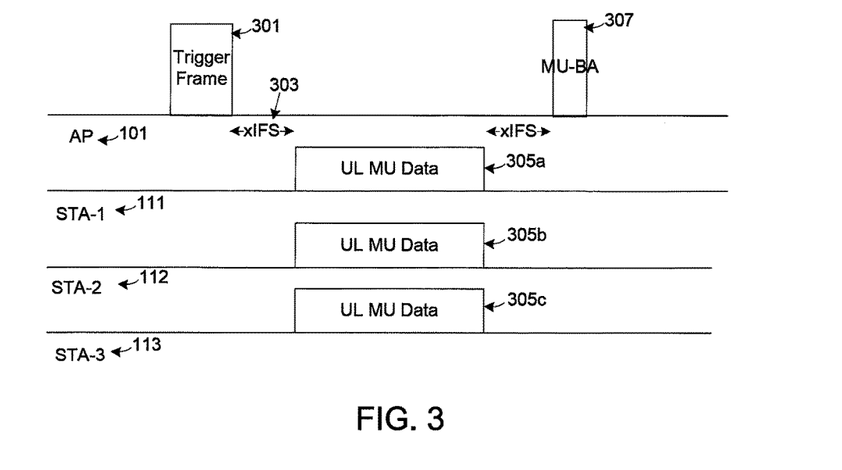
FIG. 3 illustrates a signal flowchart for management of UL MU transmissions where a trigger frame indicates the grant for STAs to transmit the UL transmission according to illustrative embodiments of this disclosure.

FIG. 3 illustrates a signal flowchart for management of UL MU transmissions where a trigger frame 301 indicates the grant for STAs to transmit the UL transmission according to illustrative embodiments of this disclosure. In these embodiments, the STAs 111-113 and the AP 101 are configured to perform UL MU transmission and reception, respectively, using a UL MU transmission protocol. The UL transmission from STAs 111-114 to AP 101 in WLANs is initiated by the AP 101. The wireless medium in local area networks like IEEE 802.11 is accessed by contention from all devices in the network using a carrier sense multiple access (CSMA) protocol. For UL transmissions, the AP 101 gains access to or "wins" the wireless medium access and transmits a trigger frame 301 indicating that this transmission opportunity (TXOP) is reserved for the UL transmission from multiple STAs. The trigger frame 301 identifies which STAs are to transmit the UL data. The trigger frame 301 is a broadcast frame which can be decoded by all STAs 111-113 in the listening or hearing range of the AP 101. On decoding the trigger frame, if the address of the STAs listed in the trigger frame 301 matches the STAs address, the STAs 111-113 transmits their data 305, a time duration 303 (e.g., inter-frame spacing of x (xIFS)) after receiving the trigger frame 301 using the resource specified by the trigger frame 301. All STAs 111-113 addressed in the trigger frame 301 begin transmission after an xIFS time duration 303 after receiving the trigger frame 301. The xIFS duration 303 specifies a pre-determined inter-frame spacing where the value x is to be determined. For example, the xIFS duration 303 may just be short inter-frame spacing (SIFS). After receiving the data from each of the STAs 111-113, the AP 101 may transmit a MU-block acknowledgement (BA) 307 to the STAs 111-113 scheduled in the UL frame. This BA transmission 307 can occur an xIFS duration 309 after receiving the end-of-frame signaling from each of the STAs 111-113 scheduled in the UL MU transmission 305.

UL MU transmissions can be of two types—UL OFDMA where users are separated in the frequency domain and UL MU-MIMO where the users are separated in the spatial domain. UL frames where STAs are separated using both OFDMA and MU-MIMO may also be supported in addition to UL MU-MIMO only and UL OFDMA only frames. The trigger frame indicates clearly whether MU-MIMO or OFDMA or a combination thereof is to be used. If OFDMA is used, then the trigger frame indicates which sub-carriers or tone units are to be used to place the STA's data. If MU-MIMO is used, then the trigger frame indicates the number of spatial streams allowed for that STA.

Embodiments of the present disclosure recognize that to enable UL MU operation, the AP 101 needs to know which of the STAs 111-113 have traffic to send, which of the STAs 111-113 can be scheduled together in the UL transmission, whether to use OFDMA or MU-MIMO. To know whether the STAs 111-113 have traffic to send, the AP 101 transmits a buffer status request message and in response, receives the buffer status response message or report which indicates the amount of traffic the STAs 111-113 have to transmit to the AP 101. The buffer status response message or report can be a Quality of Service (QoS) null frame. Additionally, the STAs 111-113 can also include (or piggyback) their buffer status response with one or more data transmissions to the AP 101 by placing the buffer status in the QoS header fields of the QoS data frame. Embodiments of the present disclosure provide techniques for managing the temporal relationship between the buffer status from the different STAs 111-113 and the relationship to the scheduling of the UL MU transmission from the AP 101. For example, embodiments of the present disclosure provide for organizing an UL transmission in relation to the buffer status transaction between the AP and the STAs and the different types of traffic at the STA and provide for establishment of traffic specific priorities at the AP. Embodiments of the present disclosure further provide formats for the buffer status request message and the types of responses expected from the AP.

Embodiments of the present disclosure provide a method to manage and enable UL MU transmissions in the WLANs. The UL MU transmission requires the AP to know the buffer status of different STAs and can therefore begin with a buffer status request/response exchange between the AP and the STA followed by a trigger frame allocating the MU resources and the actual MU transmission in a same TXOP. The buffer status response/request message can also be independently transmitted by the AP in one TXOP. The start times for the contention for transmitting the buffer status request message can be advertised by the AP in the beacon. The buffer status request can request feedback on buffer status of specific access categories. Restriction of certain access categories from responding to the buffer status request is also allowed. The buffer status request can be addressed specifically to several STAs or be open to all STAs whose buffer status meets the attributes identified in the buffer status request. Various embodiments of the present disclosure include operations of UL MU—temporal sequencing of control/management frames enabling UL MU as well as book-keeping at AP to enable free SU transmissions from AP.

Figure 4:
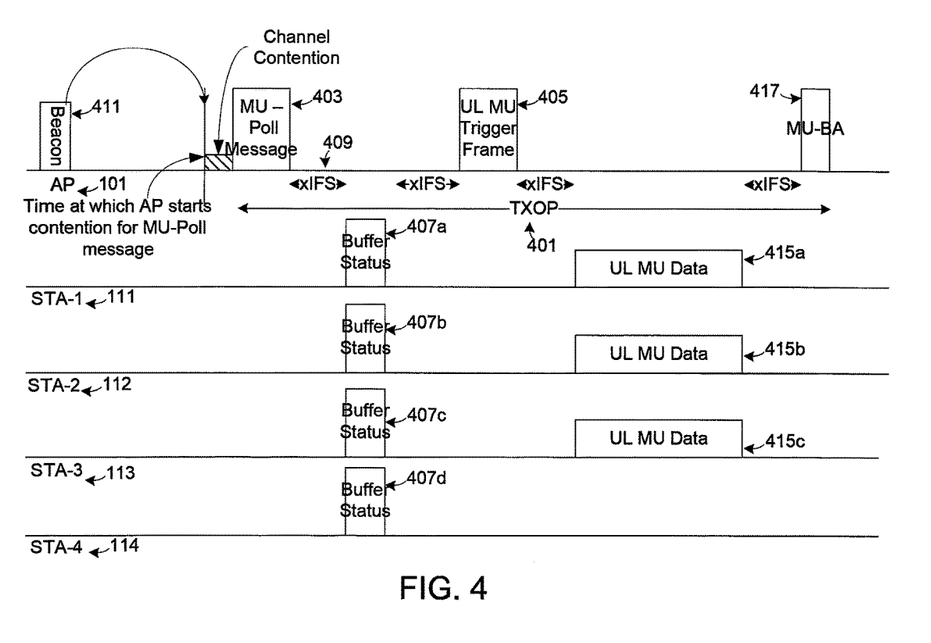
FIG. 4 illustrates a signal flowchart for management of UL MU transmissions where a buffer status request message transmission time is indicated in the beacon and the buffer status request message is the first message in the UL MU transmission opportunity according to illustrative embodiments of this disclosure.

FIG. 4 illustrates a signal flowchart for management of UL MU transmissions where a buffer status request message transmission time is indicated in the beacon and the buffer status request message is the first message in the UL MU transmission opportunity according to illustrative embodiments of this disclosure. The embodiments shown in FIG. 4 are for illustration only. Other embodiments could be used without departing from the scope of this disclosure.

In one embodiment, the UL MU TXOP 401 starts with the a buffer status request (or a MU-poll) message 403 and a UL Grant via a trigger frame 405 follows the buffer status responses 407 from STAs after an xIFS duration 409. In this embodiment, the AP 101 advertises the time 413 for when buffer status request message 403 are to be transmitted to STAs in the beacon 411. Since the buffer status request message solicits responses from multiple STAs using UL MU, the buffer status request message can be a variant of the trigger frame. The AP 101 begins contending for the channel at the advertised time 413 for the buffer status request message 403 and transmits the buffer status request message 403 once the AP 101 gains access to the medium. The AP 101 addresses a group of STAs 111-114 in the buffer status request message 043 indicating that they have to transmit their buffer status 407 to the AP 101 or an indication to the AP 101 that they have data that they would like to transmit to the AP. These STAs 111-114 in turn transmit their buffer status 407 to the AP 101. The AP 101 on receiving the buffer status 407 transmits a trigger message 405 which indicates which of the STAs 111-114 that can transmit UL data to the AP 101 and the resources allocated the allowed STAs.

In one embodiment, the STAs addressed in the trigger message 405 are a subset of the STAs that were addressed in the buffer status request message 403 that preceded the trigger message 405. In another embodiment, some of the STAs addressed in the trigger message 405 can be different from the STAs that were addressed in the buffer status request message 403 that preceded the trigger message 405. In another embodiment, the buffer status request message 403, the buffer status response messages 407, the trigger frame 405 followed by the UL MU data transmissions 415 and acknowledgement transmission 417 from the AP 101 to the STAs 111-114 may all belong the same TXOP 401.

In these embodiments, UL TXOP 401 involves the buffer status request message 403 transmitted from the AP 101, the buffer status responses 407, the trigger frame 405 (e.g., including the UL Grant), the UL MU Data 415 followed by the MU-BA 417. A duration of xIFS 409 separates these transmissions. The xIFS duration 409 specifies a pre-determined inter-frame spacing where the value x is to be determined. For example, the xIFS duration 409 may just be SIFS.

The STAs 111-114 can be listed completely at the beginning of the TXOP 401. Some STAs may just be included in the MU-Poll and the buffer status feedback portions while some may be given a UL grant (e.g., to enable a sleep or doze state for STAs not scheduled in this UL opportunity). The buffer status responses 407 can be transmitted using UL OFDMA and/or UL MU-MIMO by the STAs 111-114. The AP 101 may include a group ID indicate which STAs get UL data grant or the AP 101 may provide a list of explicit STA-IDs.

Figure 5:
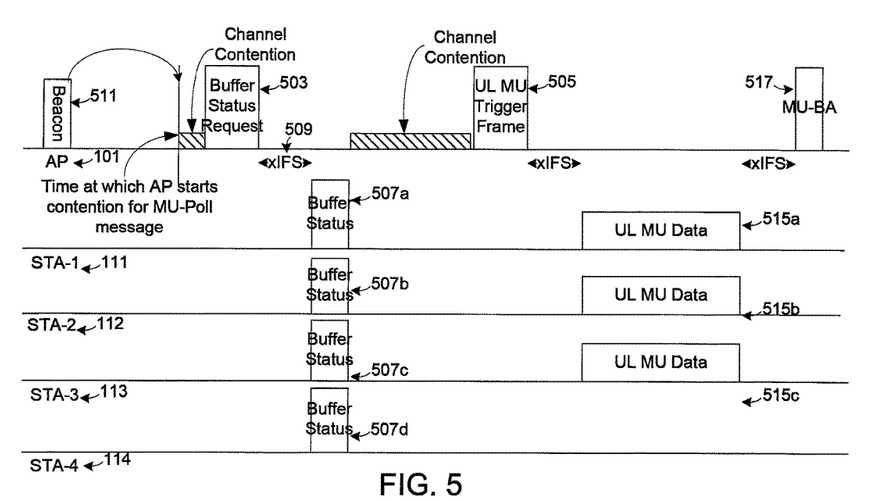
FIG. 5 illustrates a signal flowchart for an UL MU transmission method where the AP relinquishes control of the channel after receiving the buffer status response messages from the STAs according to illustrative embodiments of this disclosure.

FIG. 5 illustrates a signal flowchart for an UL MU transmission method where the AP 101 relinquishes control of the channel after receiving the buffer status response messages 507 from the STAs 111-114 according to illustrative embodiments of this disclosure. The embodiments shown in FIG. 5 are for illustration only. Other embodiments could be used without departing from the scope of this disclosure.

In these illustrative embodiments, the buffer status request 503 and UL MU Trigger Frame 507 are separated by a channel contention period, STAs 111-114 can include or piggyback their buffer status responses 507 with data. Additionally, the UL Grant via the trigger frame 505 can use the buffer status response 507 and piggybacked buffer status reports from STAs 111-114. The AP 101 can keep current the buffer status report from an STA by keeping track of and comparing the SU transmissions from a respective STA and against the buffer status reports 507 received from the STAs 111-114.

In these embodiments, the buffer status request and response exchange between AP 101 and STAs 111-114 precedes the UL MU trigger frame 505 from the AP 101 and UL MU transmissions 515 from the STAs 111-114 to the AP 101. The AP 101 relinquishes control of the medium or channel after receiving the buffer status reports 507 from the STAs 111-114. The UL MU trigger frame 505 is transmitted when AP 101 decides to schedule the UL MU transmissions 515. The AP 101 transmits the UL MU trigger frame 505 after contending for and gaining access to the medium or channel.

When scheduling STAs for UL transmission, the AP 101 takes into consideration the buffer status responses 507 that are received from the STAs 111-114 either in response to buffer status request 503 from AP or piggybacked along with the data transmitted by the STAs. The UL trigger frame 505 is generated by the AP to identify STAs who are expected to use the UL grant assigned by the AP 101 as indicated in the UL MU trigger frame 505. STAs who had previously indicated UL traffic size in the buffer status responses 507 (e.g., either standalone or piggybacked) can expect to receive UL MU grants via the MU trigger frame 505.

The AP 101 keeps track of SU transmissions from STAs who had previously indicated a presence of UL traffic, for example, prior to the signal flow illustrated in FIG. 5. After updating the AP 101 about the presence of the UL traffic, STA 111 may gain access to the medium via contention and transmit the data contents in the buffers of the STA 111 whose size was previously reported to the AP 101. If a SU transmission from the STA 111 belongs to the same traffic class as indicated in the buffer status response, then the AP 101 updates the buffer status report of the STA 111 by subtracting the buffer status indication by the amount of SU traffic received from the STA 111. The AP thus keeps the buffer status reports from different ones of the STAs 111-114 current. One practical manifestation of the traffic class could be the access categories (AC) identified in the 802.11e enhanced distributed channel access (EDCA) mechanism and indicated using traffic identifiers (TIDs) in the QoS header of the QoS frame (data or null).

Figure 6:
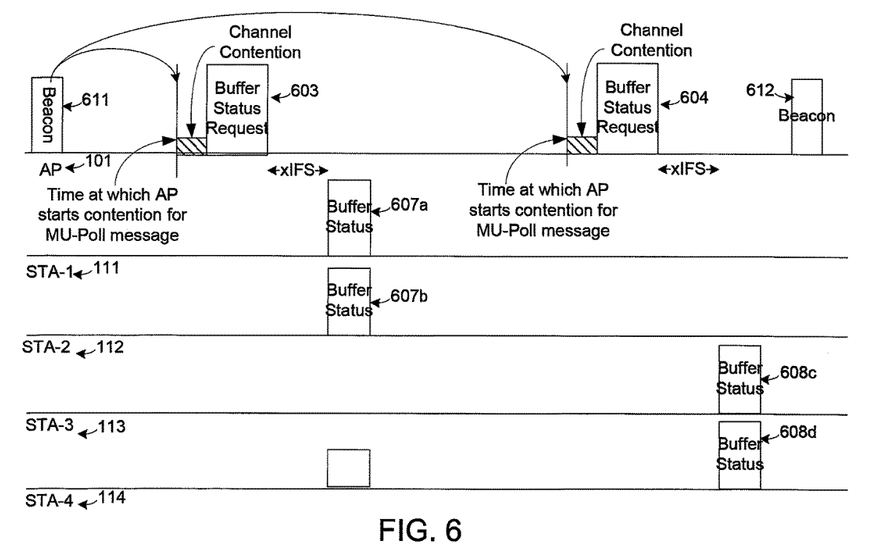
FIG. 6 illustrates a signal flowchart for management and scheduling of UL MU transmissions including advertising multiple instances of contention start times for the buffer status request in the beacon according to illustrative embodiments of this disclosure.

FIG. 6 illustrates a signal flowchart for management and scheduling of UL MU transmissions 607 including advertising multiple instances of contention start times for the buffer status request 603 in the beacon 611 according to illustrative embodiments of this disclosure. The embodiments shown in FIG. 6 are for illustration only. Other embodiments could be used without departing from the scope of this disclosure.

As illustrated, in these embodiments, the AP 101 advertises the start of the contention times for the buffer status requests 603 and 604 from the AP 101 in the beacon 611. For example, the AP advertises the targeted or expected timing for multiple buffer status requests 603 and 604 (e.g., two or more) between consecutive beacons 611 and 612. The AP 101 begins contention for the channel to transmit buffer status requests 603 and 604 at the times indicated in the beacon 611. Upon gaining access to the medium, the AP 101 transmits the UL buffer status requests 603 and 604 addressed to the STAs 111-114. The STAs 111-114, upon receiving the buffer status request 603, check if the request is addressed to the STAs. If addressed, the STAs 111-114 transmit, to the AP 101, the buffer status responses 607 and 608 describing the contents of the buffer (e.g., access class information including quality of service (QoS) including identifiers, such as traffic identifiers (TIDs)) and the buffer size (e.g., total size and/or per category size)) that meet the requirements for the responses 607 that are set in the buffer status request 603. The buffer status responses 607 and 608 are UL MU transmissions from the STAs 111-114 to the AP.

The buffer status responses 607 and 608 can be an OFDMA transmission from the STAs to the AP where the buffer status responses 607 and 608 from the STAs 111-114 occupy particular tone allocation units (also known as resource units) as specified in the buffer status requests 603 and 604. The resource map for the buffer status responses 607 and 608 may be implicit (e.g., based on STA order in the trigger map) or explicit (e.g., the exact tone unit to be used in indicated). The buffer status responses 607 and 608 may also be an MU-MIMO transmission from the STAs 111-114 to the AP 101 where a single stream is allocated to the STAs 111-114. The buffer status responses 607 and 608 may also be code division multiplexed from the STAs 111-114 to the AP 101 where the code to be used is indicated by the AP 101 either implicitly or explicitly. The AP 101 may acknowledge the received buffer status responses 607 and 608 from the STAs 111-114. If so, the AP 101 does so an xIFS duration after receiving the buffer status responses 607 and 608.

In the example illustrated, the AP 101 indicates multiple instances of contention time scheduling for the buffer status exchange in the beacon 611. In another example, in the beacon 611, the AP 101 may indicate the contention start time for the first buffer status exchange. The first buffer status request 603 indicates the start time for the second buffer status exchange message. Thus, the indication for the buffer status exchange contention time may be daisy chained with each buffer status request indicating the contention time for the next buffer status request message unless interrupted by the beacon transmission 612.

In various embodiments, the AP 101 may indicate the contention start times for the UL trigger frames that request buffer status and those for the UL MU data in the beacon 611 before the next beacon transmission 612. For example, the buffer status requests can be considered to be a specific type of a trigger frame, i.e., a trigger frame triggering buffer status reporting, while the UL MU trigger frames are another type of trigger frame, i.e., trigger frame triggering a UL MU transmission. In these embodiments, there may be numerous buffer status exchanges before the UL MU trigger frame.

Figure 7:
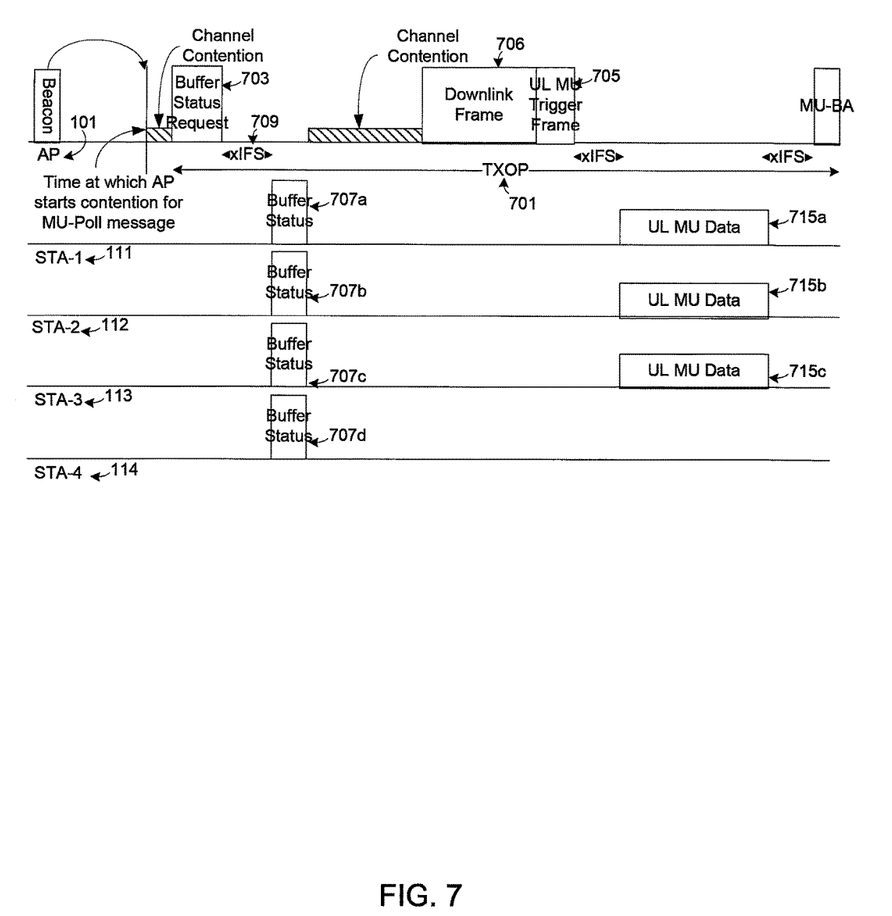
FIG. 7 illustrates a signal flowchart for management and scheduling of UL MU transmissions including a trigger frame transmitted as part of a downlink frame according to illustrative embodiments of this disclosure.

FIG. 7 illustrates a signal flowchart for management and scheduling of UL MU transmissions including a trigger frame transmitted as part of a downlink frame according to illustrative embodiments of this disclosure. The embodiments shown in FIG. 7 are for illustration only. Other embodiments could be used without departing from the scope of this disclosure.

In these embodiments, the AP 101 transmits the UL MU trigger frame as part of a DL frame 706 (e.g., a DL OFDMA frame). The UL MU trigger frame 705 may be preceded by the buffer status exchanges (703 and 707) between the AP 101 and STAs 111-114 or piggybacked buffer status updates from AP 101 to STAs 111-114.

In some cases, the DL frame 706 that includes the UL MU trigger frame 705 can be a DL OFDMA frame where the packet holding the UL MU trigger information occupies a portion of the tone units indicated by the signaling fields in the PLCP header. The DL frame 706 occupies a portion of the TXOP 701 indicated in the Legacy Signal Field (L-SIG) of the physical layer convergence procedure (PLCP) protocol data unit (PPDU). The UL MU transmissions 715 from the STAs 111-113 occupies another portion of the TXOP 701 and the STAs 111-113 signaled in the UL MU trigger frame 705 will begin transmitting an xIFS duration 709 after the DL transmission 706 has ended.

The DL frame 706 that the contains the UL MU trigger frame 705 can be part of the DL MU-MIMO frame where the packet containing the UL MU trigger information occupies one of the streams of the UL MU-MIMO packet.

In some cases, the AP 101 may transmit the UL MU trigger information in the signaling fields of the PLCP header of the DL MU frame 706. There are numerous ways to include the UL MU trigger information in the signaling field of the PLCP header. For example, the signaling information of the UL data may be carried in a format similar to the signaling information for the DL data with a flag indicating allocation for either UL or DL. In another example, the UL MU trigger information may be signaled after signaling the DL MU allocations.

The STAs that have received DL QoS data that needs to be acknowledged and are also scheduled to transmit UL MU data as indicated in the trigger frame can include or piggyback the acknowledgement (ACK or block ACKs) along with the UL MU data 715 transmitted to the AP 101.

In various embodiments, the AP 101 keeps track of single user (SU) transmissions from STAs who had previously indicated presence of UL traffic. After updating the AP 101 about the presence of the UL traffic, the STA(s) may gain access to the medium via contention and transmit the contents in the buffers whose size was previously reported to the AP 101. If a single user transmission from the STA(s) belongs to the same traffic class as indicated in the buffer status response, then the AP 101 updates the buffer status report of the respective STA(s) by subtracting the buffer status indication by the amount of SU traffic received from the STA. The AP 101 thus keeps the buffer status reports from different STAs current. One practical manifestation of the traffic class could be the TIDs corresponding to the different access categories (AC) identified in the 802.11e enhanced distributed channel access (EDCA) mechanism.

In another embodiment, buffer status responses included (or piggybacked) with data transmissions from STAs may precede the UL Grant via trigger frame. No explicit buffer status requests from the AP needed to precede the transmission of a UL MU trigger frame from the AP for the STAs to transmit their buffer status report. Moreover, there is no restriction on when the AP 101 transmits the UL MU trigger frame.

In another embodiment, the AP 101 gathers buffer status information from the STAs 111-114 in formats other than the direct buffer status report/response exchange between APs 101 and STAs 111-114. The STAs 111-114 may transmit UL buffer status by including or piggybacking the buffer status report: (a) with any single user transmissions to the AP 101 (for example: in the QoS header of the QoS data frame), (b) as part of a response to control and management frames to the AP 101, (c) with any acknowledgement or block acknowledgement transmissions to the AP 101, or (d) as part of the beamforming vector or channel status information update to the AP 101. The AP 101 uses the buffer status information from the STAs 111-114 to schedule the STAs 111-114 as part of the UL MU transmission. The AP 101 transmits UL MU trigger frame indicating which of the STAs 111-114 are to transmit UL data and the resources they may use to transmit the UL packet. Those STAs that transmitted buffer status information to the AP by piggybacking with SU or acknowledgements can expect to be scheduled for the UL data using the MU trigger frame.

In some embodiments, the AP 101 may transmit UL trigger frames at times other than the times advertised in the beacon. The AP 101 can use the buffer status reports received and other scheduling considerations to decide when to transmit the UL MU trigger frames in addition to the contention start times for the UL MU trigger frame indicated in the beacon. In circumstances where the AP 101 has no need to transmit the UL trigger frames due to lack of UL transmission request or other scheduling conflicts, the AP 101 may not transmit the UL trigger frame at the advertised time in the beacon.

In various embodiments, access categories (AC) or the associated TIds may be used in the UL MU by including all AC, restricting certain ACs, or using semi-static or dynamic restrictions. In one embodiment, the AP 101 can set the quality of service (QoS) categories that are supported for the UL MU transmissions. The AP 101 can advertise the QoS classes the AP 101 can support for UL transmissions from STAs. In an example, the AP 101 may advertise the highest priority class of traffic the AP 101 is capable of or wants to support in the UL transmissions. For example, if the AP advertises AC_VI as the category the AP 101 can support, then the STAs can report buffer status for those packets that belong to classes AC_VI or packets that are of lower priority than AC_VI (e.g., AC_BE or AC_BK). In another example, if the AP 101 advertises that the highest priority traffic AC_VO can be supported via UL MU transmissions, then the STAs can feedback buffer status for all access categories. In another example, this advertisement may be implicit, thus the STAs may assume that all traffic is reported and may report feedback buffer status for all access categories. This reporting may include, for example, an indicator of the QoS category such as a traffic identifier (TID). The buffer status for each category may also be separately listed by the STA.

The AP 101 may also make the requirement corresponding to buffer status feedback based on access category specific, e.g., STAs feedback buffer status request corresponding to a particular access category. For example, if the AP advertises AC_VI as the desired or supported access category, then the STAs can report buffer status for those packets that belong to the AC_VI category.

Please note that the term QoS, priority, access category is used to illustrate a specific examples of granularity at which the embodiments of the present disclosure can be applied. This does not preclude other ways of enforcing quality of service requirements. In other examples, latency and jitter parameters can be fine-tuned and made more granular. The MAC Service Data Unit (MSDU) lifetimes could be another example of quality of service requirements.

In other examples, if no quality of service requirement is advertised, the STAs can report the buffer status for only the best effort traffic. Alternatively, if no quality of service requirement is advertised, the STA can report the buffer status for all access categories in its queue. For example, the STA may either individually list queue lengths per access category or indicate an aggregate queue length making no distinction among the access categories. Any and all of these configurations can be statically preconfigured in network settings or change with dynamic signaling via a QoS data or a management frame.

In various embodiments of the present disclosure, the UL MU data transmissions may be limited to only BE (best effort) or BK (background) traffic and disallow VI (video) or VO (voice) ACs from being included in UL MU data transmissions for reliability reasons. In these embodiments, the UL MU transmission may only be allowed for certain specific types of traffic whose quality of service class does not include tight requirements on the delay, jitter, or quality of service. In one example, the UL MU transmission may be used for traffic that belongs to AC_BE or AC_BK. This may also be seen as exclusion of certain access categories that have requirements on the quality of service parameters, such as, delay, jitter etc., which can be supported reliably via UL MU transmissions.

Various embodiments provide configuration of buffer status request. For example, contention start times and other attributes of the buffer status request may be is set in the specification (i.e., have no variation) or may advertised in the beacon. In these embodiments, the contention start time(s) for transmitting the buffer status request procedure (e.g., a target transmission time or target wait time for a trigger frame) is advertised in the beacon. The beacon may indicate how many buffer status requests are likely to be transmitted in the time interval before the transmission of the next beacon. The number of buffer status requests in the interval between two beacon transmissions can be changed semi-statically. When changed semi-statically, the AP 101 may indicate when the AP 101 could change the number of buffer status requests.

In an embodiment, some buffer status requests may support presence of random access channels whose contention start times are advertised in the beacon.

Various embodiments of the present disclosure provide configuration for the contents of buffer status request. For example, the content of the request may be written explicitly in the specification (e.g., one format with no choice), advertised in the beacon along with contention start time (semi-static), or determined at the time of transmission (dynamic).

In various embodiments, the contents of the buffer status request or the format used by the buffer status may include some or all of the following:

the access category supported in the UL MU transmission and restrictions of access categories if any;
whether the buffer request is specifically addressed to STAs or open;
whether buffer request is specifically addressed, the identification of the STAs who should respond to the buffer status request;
the minimum size of the buffer status that the STAs must have to respond to the buffer status request;
the resources and the format to be used by the STAs to transmit the buffer status request;
the codes that the STAs must use in case the buffer status request is transmitted on a random access resource; and
whether the buffer status request contains a random access resource and if present, the location of the random access resource.

The buffer status request message format is a variant of the trigger frame format and is used when AP 101 decides to transmit the buffer status request message. The size of the buffer status request message can vary and the information the buffer status request message carries can be signaled by enabling or disabling flags for certain fields in the message. The format of the buffer status message can also be signaled by using a control sequence at the beginning of the frame.

In another embodiment, the buffer status request message format can be specified in the beacon along with the start of the contention start times for the transmission of the buffer status request. These buffer message formats can specifically be designed to enable certain additional features in the buffer status request. For example, the contention start time for the buffer status message that contains a random access resource can be advertised in the beacon. In another example, an open buffer status message that does not explicitly advertise STA IDs but requests the STAs that meet certain requirements to transmit a buffer status response can also be advertised in the beacon.

Figure 8:
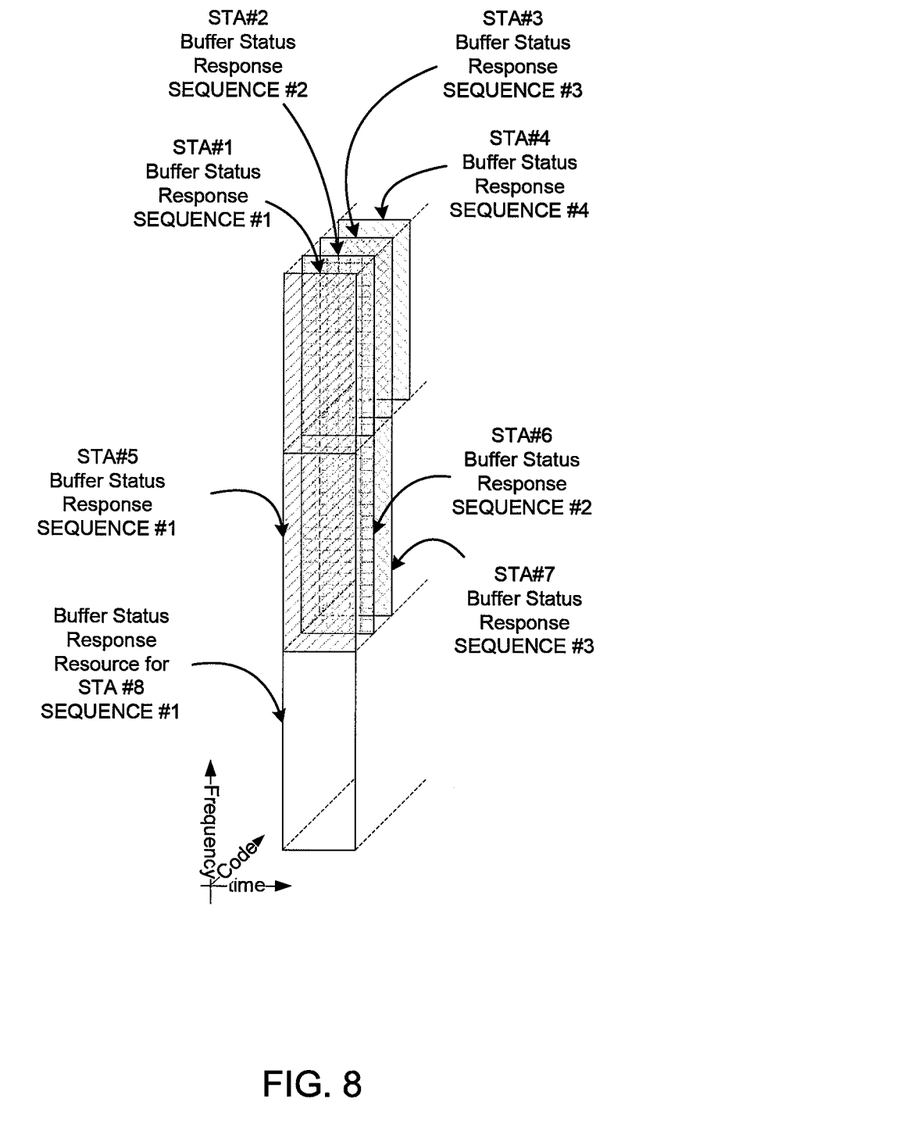
FIG. 8 illustrates code based separation of buffer status response from STAs according to illustrative embodiments of this disclosure.

FIG. 8 illustrates code based separation of buffer status response from STAs according to illustrative embodiments of this disclosure. The embodiments shown in FIG. 8 are for illustration only. Other embodiments could be used without departing from the scope of this disclosure Various embodiments of the present disclosure provide STA addressing with the beacon, for example, specific (e.g., STA ID transmitted) or open (e.g., random access). For example, specific attributes of buffer status request may be advertised and only STAs that meet the requirements of these specific attributes respond using a code. In an embodiment, buffer status request messages can address STAs explicitly by using their STA IDs and/or group IDs or allow for an open buffer status response message addressed to all STAs indicating that only those STAs that meet the attributes listed in buffer status request need to respond to the buffer status message. In response, when explicitly addressed, STAs respond to the buffer status request message by transmitting a buffer status response in the resource, a SIFS duration after receiving the buffer status request.

When buffer status messages do not address any specific STA and instead list attributes of the buffer status that the AP is interested in identifying, the STAs whose buffer status satisfies the requirements indicated in the buffer status request will transmit the buffer status response as a code in the random access resource allocated to the STA or using a user specific code sequence to help the AP identify the STA over any resource identified for buffer status response a SIFS duration after receiving the buffer status request. The resource used can be a particular frequency resource as illustrated, by way of example, in FIG. 8.

In these embodiments, the trigger frame for the resource request could be transmitted to specific STAs addressed by the trigger frame with a specific resource allocation. This transmission configuration is unambiguous and no different from other MU transmissions. In another example, the trigger frame for the resource request could be transmitted a random access trigger frame. For example, STAs with data in need of UL grant will pick a resource and transmit a known sequence, e.g., 1 bit resource request with energy detection at AP. This configuration has the advantage of saving resources but may increase lost requests due to collisions. In another example, the trigger frame for the resource request could be transmitted with no explicit addressing. In this example, STAs with STA IDs pick an associated sequence and transmit in a pre-assigned resource, e.g., 1 bit resource request with energy detection at AP. The AP identifies the STA that is requesting for resources which makes it easier to schedule and identify.

For embodiments using resource request including random access, the AP indicates random access based resource request. For example, the AP indicates restrictions on transmitting buffer status, e.g., packet sizes (max limit), access categories, etc. The STAs first pick a frequency resource randomly and transmit a randomly chosen code from a codebook. If there are restrictions indicated in the trigger frame, then only those STAs that meet the restrictions transmit. The AP acknowledges the codes received and does not need to indicate STA ID. The code is used by the AP to assign the UL MU resources to the STAs.

For embodiments using resource request including resource request without explicit addressing, the AP indicates specified resource request with STA space partitioning and assignment in frequency domain. For example, the AP indicates restrictions on transmitting buffer status, e.g., packet sizes (max limit), access categories, etc. Only those STAs that have UL scheduling needs transmit in the assigned resource using a code determined by the STA space partitioning. The AP acknowledges the STAs that sent resource request and schedules UL MU transmission.

Embodiments of the present disclosure provide STA space partitioning. In these embodiments, the trigger frame indicates a group of STAs allowed, the allowed STAs frequency resource unit, and the code base to be used. The code that the STA uses can be predetermined at the associated as some function of the STA ID. STA group indication could be indicated by the starting and the ending STAID of the group. The STAs use the frequency resource unit (RUs) and code base to bound the group size and mention only the starting STA ID. For example, for a 242 tone RU and 242 codes, 242 STAs can be supported. In another example, with 80 MHz bandwidth 4×242 RU yields 964 supported users partitioned into 4 RUs. In one example, the STAs may derive the code index from the difference between their and starting STA ID.

Embodiments of the present disclosure provide a frame format for resource request trigger. The frame format for the resource request trigger includes a field for the access category supported in the UL MU transmission and restrictions of access categories if any, a field for indicating whether the buffer request is specifically addressed to STAs (e.g., implicit or explicit) or open. If buffer request is specifically addressed, the frame format for the resource request trigger includes a field for the identification of the STAs who should respond to the buffer status request. The frame format for the resource request trigger includes a field for STA space partitioning for implicit STA addressing and RA resource partitioning for open buffer request. Field restrictions on the frame format for the resource request trigger include the minimum size of the buffer status that the STAs must have to respond to the buffer status request as well as the resources and the codes to be used by the STAs to transmit the buffer status request in case of random access trigger. The resource request can be combined with a data trigger. For example, the frequency location of resource request trigger to be explicitly indicated along with the above discussed fields.

One or more embodiments of the present disclosure provide a method for UL transmission where the UL transmission begins with a buffer status request message addressed to a set of STAs a subset of whom are to be indicated in the trigger frame for UL transmission, a method to indicate the contention start times for transmitting the buffer status response messages in the beacon, and a method to indicate if the indicated buffer status request message indicates the start of an UL TXOP. One or more embodiments of the present disclosure provide a method for UL transmission where the AP transmits the UL MU trigger frame as part of a DL frame. The UL MU trigger frame may be preceded by the buffer status exchanges between AP and STAs or piggybacked buffer status updates from AP to STAs. One or more embodiments of the present disclosure provide a method where the STAs piggyback their buffer status reports with other transmissions to the AP and a method for UL transmission where the AP relinquishes control of the medium after receiving the buffer status reports from STAs.

One or more embodiments of the present disclosure provide a method where the buffer status request is specific to a particular quality of service or access category of the traffic that the STA may possess and a method where the highest priority indicated also subsumes the priorities lower than the priority indicated. One or more embodiments of the present disclosure provide a method where the buffer status request message format can be dynamically chosen by the AP at the time the AP chooses to transmit the buffer status request message. One or more embodiments of the present disclosure provide a format for the buffer status request messages that allows for an open buffer status response message addressed to all STAs indicating that only those STAs that meet the attributes listed in buffer status request need to respond to the buffer status message. One or more embodiments of the present disclosure provide a method where the STAs whose buffer status satisfies the requirements indicated in the buffer status request will transmit the buffer status response as a code in the random access resource allocated to the STA or using a user specific code sequence to help the AP identify the STA over any resource identified for buffer status response a SIFS duration after receiving the buffer status request.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A station (STA) for transmitting in a wireless local area network (WLAN), the STA comprising:
   a transceiver configured to receive a beacon signal from an access point (AP) in the WLAN;
   a controller configured to identify, from the beacon signal, a target transmission time of a buffer status request message transmitted to a group of STAs by the AP for an uplink multi-user transmission;
   wherein the transceiver is further configured to:
      receive the buffer status request message transmitted to the group of STAs, based on the target transmission time, the buffer status request message including a request for a buffer status report from the group of STAs;
      send in response to the request, a message reporting buffer status information at the STA regarding data the STA has to transmit;
      wherein the message reporting the buffer status information of the STA includes buffer status per traffic identifier and buffer size; and
      receive a trigger frame indicating which STAs can initiate the uplink multi-user transmissions to the AP.

2. The STA of claim 1, wherein the buffer status request message transmitted to the group of STAs is included within a downlink OFDMA frame.

3. The STA of claim 1, wherein the controller is further configured to transmit the uplink multi-user transmission from the STA within a portion of a TXOP (transmission opportunity).

4. The STA of claim 1, wherein the controller is further configured to:
   send, in response to the trigger frame, the data that the STA has to transmit from the STA to the AP as part of the uplink multi-user transmission.

5. The STA of claim 1, wherein the controller is further configured to identify, from the beacon signal, respective target transmission times of multiple buffer status request messages to be transmitted by the AP between two beacon transmission intervals.

6. The STA of claim 1, wherein the buffer status request message is included in a downlink data transmission in a transmission opportunity and is followed by the uplink multi-user transmission in another portion of the transmission opportunity.

7. The STA of claim 2, wherein the buffer status request message indicates a group of STAs allowed access and a frequency resource unit and code base to be used to send the buffer status information.

8. An access point (AP) for transmitting in a wireless local area network (WLAN), the AP comprising:
   a controller;
   a transceiver operably connected to the controller and configured to:
      transmit, to a group of STAs in the WLAN, a beacon signal that indicates a target transmission time of a buffer status request message to be transmitted by the AP for an uplink multi-user transmission;
      transmit the buffer status request message to the group of STAs based on the target transmission time, the buffer status request message including a request for a buffer status report;
      receive, in response to the request from at least one of the group of STAs, a message reporting buffer status information of the at least one STA of the group of STAs regarding data the at least one STA has to transmit;
      wherein the message reporting the buffer status information of the STA includes buffer status per traffic identifier and buffer size; and
      transmit a trigger frame indicating which STAs can initiate the uplink multi-user transmissions to the AP.

9. The AP of claim 8, wherein the transceiver is configured to:
   transmit the buffer status request message within a downlink OFDMA frame.

10. The AP of claim 8, wherein the transceiver is further configured to receive uplink multi-user transmissions from the STAs within a portion of a TXOP (transmission opportunity).

11. The AP of claim 8, wherein the transceiver is further configured to:
   receive, in response to the trigger frame, the data that the STAs have to transmit from the STAs to the AP as part of the uplink multi-user transmission.

12. The AP of claim 8, wherein the beacon signal further indicates respective target transmission times of multiple buffer status request messages to be transmitted by the AP between two beacon transmission intervals.

13. The AP of claim 8, wherein the buffer status request message is included in a downlink data transmission in a transmission opportunity and is followed by the uplink multi-user transmission in another portion of the transmission opportunity.

14. A method for operating a station (STA) in a wireless local area network (WLAN), the method comprising:
   receiving a beacon signal from an access point (AP) in the WLAN;
   identifying, from the beacon signal, a target transmission time of a buffer status request message transmitted to a group of STAs by the AP for an uplink multi-user transmission;
   receiving the buffer status request message transmitted to the group of STAs based on the target transmission time, the buffer status request message including a request for a buffer status report from the group of STAs;

sending in response to the request, a message reporting buffer status information of the STA regarding data the STA has to transmit;

wherein the message reporting the buffer status information of the STA includes buffer status per traffic identifier and buffer size; and receiving a trigger frame indicating which STAs can initiate the uplink multi-user transmissions to the AP.

15. The method of claim 14, wherein the step of receiving further comprises receiving the buffer status request message within a downlink OFDMA frame.

16. The method of claim 14 further including the step of transmitting the uplink multi-user transmission from the STA within a portion of a TXOP (transmission opportunity).

17. The method of claim 14, further comprising:
sending, in response to the trigger frame, the data that the STA has to transmit from the STA to the AP as part of the uplink multi-user transmission.

18. The method of claim 14, wherein identifying the target transmission time comprises identifying, from the beacon signal, respective target transmission times of multiple buffer status request messages to be transmitted by the AP between two beacon transmission intervals.

19. The method of claim 14, wherein the buffer status request message is included in a downlink data transmission in a transmission opportunity and is followed by the uplink multi-user transmission in another portion of the transmission opportunity.

20. The method of claim 15, wherein the buffer status request message indicates a group of STAs allowed access and a frequency resource unit and code base to be used to send the buffer status information.

* * * * *